Dec. 30, 1969 H. E. MENOLD 3,486,509

SNUFFER INSERT FOR VEHICLE ASH TRAY

Filed May 23, 1968

INVENTOR.
HERMAN E. MENOLD
By Huebner & Worrel
ATTORNEYS.

United States Patent Office 3,486,509
Patented Dec. 30, 1969

3,486,509
SNUFFER INSERT FOR VEHICLE ASH TRAY
Herman E. Menold, 11347 Davenrich St.,
Santa Fe Springs, Calif. 90670
Filed May 23, 1968, Ser. No. 731,484
Int. Cl. A24f *13/18*
U.S. Cl. 131—235  9 Claims

ABSTRACT OF THE DISCLOSURE

A snuffer device including a spring clip for attachment within a vehicle ash tray and having a tapered, vertical bore within which the lighted end of a cigarette is inserted. The snuffer has an inclined bottom which provides forward clearance for passage of extinguished ashes from the snuffer bore into an open part of the ash tray, and which also provides a rear wall of substantial height for affixing said clip to the snuffer.

BACKGROUND OF THE INVENTION

When cigarettes are being smoked in an automobile or truck, it is important that they be completely extinguished before they are dropped into an ash tray of the vehicle, to prevent continued, objectionable smoldering of the cigarette in the ash tray, and to prevent hazardous ignition of papers which may have been deposited in the ash tray, such as cigarette packages, cigar wrappers, candy and gum wrappers, or the like. Most automobile and truck ash trays are provided with a small, apertured cup that is mounted on a tab or the like and disposed over a central portion of the ash tray receptacle, which is intended to be used as a means for extinguishing cigarettes. However, this small, apertured extinguishing cup is somewhat difficult to use for its intended purpose, requiring that the lighted end of a cigarette be pushed and twisted and ground into the cup in order to be sure that the cigarette is completely extinguished.

Because conventional automobile and truck ash trays are not provided with a cigarette extinguishing device which is either convenient or completely effective, smokers will frequently deposit cigarettes in the ash tray which are only partially extinguished, or without even attempting to extinguish them. A very serious result of the generally ineffective nature of the conventional apertured extinguishing cup provided in most automobile and truck ash trays is that many smokers prefer not to bother using such device, and rather than placing a lighted cigarette in the ash tray, will simply flick the lighted cigarette out of the automobile or truck window, thereby creating a very serious fire hazard.

SUMMARY OF THE INVENTION

In view of these and other problems in the art, it is a principal object of the present invention to provide a cigarette snuffer device adapted to be attached within an automobile or truck ash tray, and which requires for effective extinguishing operation only that a cigarette be inserted into a tapered bore of the snuffer device and left in that position for a few seconds. Then, when the cigarette is thus extinguished, it is simply withdrawn from the bore and deposited in the ash tray.

Another object of the invention is to provide a novel cigarette snuffer device of the character described for attachment within a vehicle ash tray, which has a tapered, vertical bore within which the lighted end of the cigarette is inserted for rapid snuffing action, the device having an inclined bottom which provides forward clearance for passage of extinguished ashes from the snuffer bore into an adjacent open portion of the ash tray, such inclined bottom also cooperating in the structure to provide a rear wall of substantial vertical extent for convenient and secure affixing to the snuffer device of the fastener means for attaching the snuffer to the ash tray.

A further object of the invention is to provide a novel cigarette snuffer device of the character described which includes spring fastener means affixed to the rear wall of the snuffer and projecting rearwardly therefrom for removable attachment of the snuffer to the conventional apertured extinguishing cup found in most automobile and truck ash trays.

A still further object of the invention is to provide a novel cigarette snuffer device adapted to be operatively positioned within the ash tray of an automobile or truck, which is highly efficient as a cigarette snuffer, is simple and economical to produce, is attractive in appearance, is easily operatively positioned within the ash tray or removed therefrom, and which may be disposed in a variety of selected positions within the vehicle ash tray.

Further advantages and objects of the invention will appear during the following part of this specification, wherein the details of construction and mode of operation of a preferred embodiment are described with reference to the accompanying drawing, in which:

DETAILED DESCRIPTION

Figure 1:
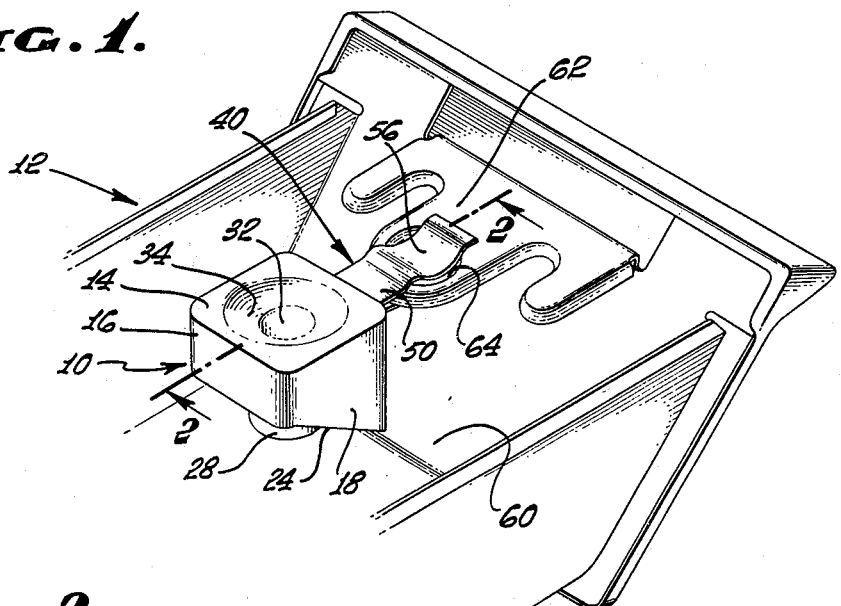
FIGURE 1 is a perspective view illustrating a cigarette snuffer device according to the present invention operatively disposed within an automobile or truck ash tray.

Referring to the drawing, FIGURE 1 thereof illustrates a snuffer unit 10 according to the present invention operatively mounted within a conventional automobile or truck ash tray 12.

The snuffer unit 10 per se is preferably molded from a suitable plastic material, but alternatively may be formed of aluminum or other suitable metal. The form of the invention that is illustrated in the drawing has a generally hollow body, although it is to be understood that if desired the body may be generally solid in construction, with the snuffer bore being the only hollow part.

The presently preferred embodiment which is illustrated in the drawing includes a snuffer having a generally horizontal top wall 14, with a front wall 16, a pair of side walls 18 and a rear wall 20 all depending from the top wall 14 so as to form a generally vertically oriented member having a substantially square cross-section with rounded corners. The bottom of the snuffer unit 10, as defined by the lower edges of the walls 16, 18 and 20, is inclined from an uppermost point at the lower edge 22 of front wall 16 downwardly and rearwardly along the lower edges 24 of side walls 18 to a lowermost point at the lower edge 26 of rear wall 20. Thus, the bottom of the body part of the snuffer unit 10, as defined by the lower edges of the walls, has the general configuration of a square member intersected by a plane which is tilted from the horizontal in the front-rear direction so as to incline downwardly and rearwardly from the front wall 16 to the rear wall 20.

Integrally formed with and projecting vertically downwardly from the center of top wall 14 is a frusto-conical snuffer tube 28 which terminates at a lower end 30 that is intermediate the lower edges 22 and 26 of the respective front and rear walls 16 and 20. The snuffer tube 28 has a frusto-conical bore 32 therein which opens at the top in a lead-in taper or flare 34. The large diameter portion of the bore 32 is slightly larger than the diameter of a typical cigarette, while the small diameter portion of the bore 32 adjacent lower end 30 is somewhat smaller than the diameter of a typical cigarette. Thus, the lighted end of a cigarette which is to be snuffed out in the device is easily insertable into the upper end of the frusto-conical bore 32, being guided into the bore 32 by the lead-in taper 34, and the lighted end will move downwardly into the bore 32 to a terminal position intermediate the upper and lower ends of the bore 32. The conical configuration of the bore will hold the cigarette firmly in this position when the smoker releases the cigarette from between his fingers, and because of the vertical orientation of the bore 32 the hot exhaust gases from the burning end of the cigarette will tend to rise, and thereby remain in the lower end portion of the bore 32 as a shield against entry of oxygen to support further combustion, whereby in a matter of only a few seconds the cigarette will be completely snuffed out. Then, all that is necessary is for the smoker to lift the cigarette upwardly out of the bore 32 and drop it into the ash tray receptacle.

By means of the inclined bottom of the snuffer body, a forward clearance is provided for the passage of extinguished ashes from the lower end of the snuffer bore 32 into an open part of the ash tray 12 adjacent the snuffer unit 10. Since the lower end 30 of the snuffer tube 28 is disposed above the lower edge 26 of rear wall 20, no matter how low the snuffer unit 10 may be placed in the ash tray 12, even if the lower rear edge 26 rests against the bottom of the ash tray, nevertheless there will be adequate clearance between the lower end 30 of the snuffer tube 28 and the bottom of the ash tray, to allow the ashes to shift forwardly out of the inclined opening at the bottom of the snuffer unit.

The extended vertical length of the rear wall 20 provides adequate support structure for attachment of the fastener means to the snuffer unit 10 for fastening the snuffer unit 10 to the automobile or truck ash tray 12. Additionally, by attaching such fastener means to the rear wall 20, regardless of the particular type of fastener means that is employed and regardless of where within the ash tray the snuffer unit may be mounted, the fastener means cannot in any way interfere with the free passage of extinguished ashes forwardly out of the inclined bottom opening of the snuffer unit 10.

The rear wall 20 of the snuffer unit is provided with a wide, vertical recess to form a slot 36 therein, leaving a central fastener support web 38 in the rear wall 20 of the unit. The portion of the lower edge 26 of rear wall 20 which forms the lower edge of this fastener support web 38 is beveled generally in the same plane as the incline of the bottom, to facilitate the engagement of a spring fastener device 40 with the web 38.

The spring fastener device 40 is generally L-shaped, including a vertical spring clip portion 42 having outer and inner resilient legs 44 and 46, respectively, which are adapted to resiliently tightly engage the fastener support web 38 therebetween, with the outer leg 44 seated within the slot 36 in rear wall 20 to secure the spring fastener device 40 against twisting movement relative to the snuffer unit 10. The fastener device 40 also includes a generally horizontal spring clip portion 48 which includes a leg 50 forming a continuation of the leg 44 bent generally at a right angle with respect to the leg 44, and a leg 52 which is integrally attached to the forward end portion of leg 50, as by welding. The legs 50 and 52 of the horizontal spring clip portion 48 terminate at their rearward ends in upwardly facing, nested gripping jaws 56 and 58, respectively.

The ash tray 12 includes a receptacle portion 60 which is conventionally slidably mounted as a drawer under or in the dashboard of an automobile or truck, or may be otherwise located in a vehicle. A tab 62 projects generally horizontally into the receptacle portion 60 from one or more of the walls of the receptacle portion, spaced upwardly from the bottom of the receptacle, the tab 62 providing support for a small, apertured extinguishing cup 64.

Figure 2:
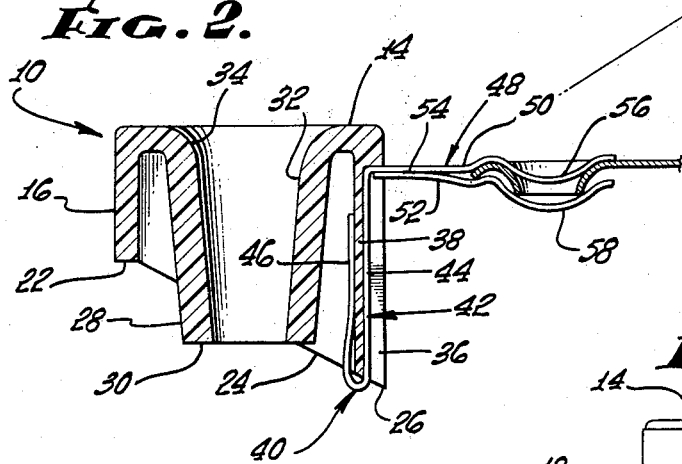
FIGURE 2 is a partial vertical section taken on the line 2—2 in FIGURE 1, illustrating structural details of the snuffer device.
Figure 4:
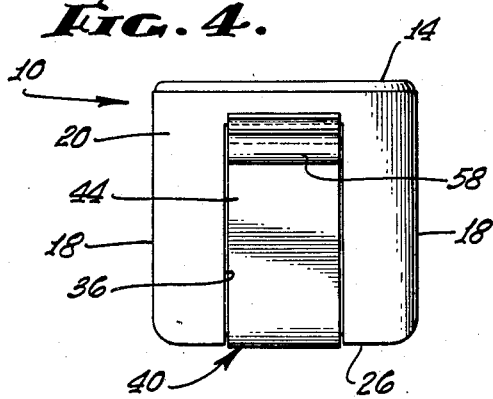
FIGURE 4 is a rear elevational view which, together with FIGURE 2, illustrates the mounting of the spring attachment means on the rear wall of the snuffer device.
Figure 3:
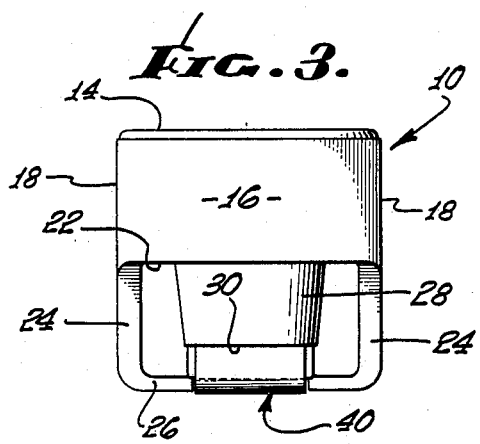
FIGURE 3 is a front elevational view of the cigarette snuffer.

This small extinguishing cup 64 provides a convenient supporting structure upon which the present invention can be mounted in a desirable position within the ash tray 12. The attachment is effected simply by snapping the cup-shaped gripping jaws 56 and 58 of the spring fastener device 40 of the present invention over the apertured extinguishing cup 64 of the ash tray 12 as shown in FIGURES 1 and 2, so that the extinguishing cup 64 is gripped between the jaws 56 and 58. This not only provides a stable attachment for the snuffer unit 10, but additionally permits selective locating of the snuffer unit 10 in a variety of positions. In FIGURE 1 the snuffer unit 10 is illustrated as disposed directly forward of the tab 62 and cup 64, generally centrally positioned in the ash tray 12. However, if desired, the snuffer unit 10 can be shifted toward either side of the receptacle 60 and rearwardly to make access thereto more convenient for some persons.

While the presently preferred spring fastener device 40 has been shown and described herein, it is to be understood that other types of fastening devices may be affixed to the web portion 38 of rear wall 20 to provide differing modes of attachment of the snuffer unit 10 to the automobile or truck ash tray 12. Alternatively, a simpler form of spring clip may be engaged to the support web 38 and snapped over one of the side walls of the receptacle 60 of the ash tray. Experimentation has shown that regardless of the particular attachment means, so long as it is connected the the snuffer unit 10 on the rear wall 20, and particularly is located by the slot 36 in the rear wall and secured to the support web 38, the snuffer device will be securely mounted in the ash tray, and the fastener means will not interfere with the free forward flow of extinguished ashes out through the forwardly opening inclined bottom of the device, regardless of where the snuffer unit 10 may be positioned in the ash tray.

While the present invention has been shown and described herein in what is conceived to be the most practical and preferred embodiment, it is recognized that departures may be made therefrom within the scope of the invention, which is therefore not to be limited to the details disclosed herein.

I claim:

1. A cigarette snuffer device adapted to be attached to an extending member within a vehicle ash tray, comprising a body having top and bottom surfaces, a front and a rear, said bottom surface inclining forwardly and upwardly at a substantial angle from the horizontal from a lowermost point proximate the rear of the body to an uppermost point proximate the front of the body so as to provide a forwardly opening clearance space under the body and to provide the rear portion of the body with a substantially greater vertical extent than the front of the body, the body defining a generally vertically oriented snuffer bore opening at its upper and lower ends proximate said top and bottom surfaces, respectively, said bore tapering from a diameter larger than that of a cigarette proximate its upper end to a diameter smaller than that of a cigarette proximate its lower end, the lower end of the bore communicating with said forwardly opening clearance space under the body to allow generally unobstructed passage of extinguished ashes out from underneath the body, and fastener means affixed to the rear of the body and adapted for attaching said body within a vehicle ash tray, said body being provided with a generally vertically oriented notch at the rear thereof, said fastener means having a portion thereof which is generally complementary with and located within said notch for positioning the connection of the fastener means to the body.

2. A cigarette snuffer device as defined in claim 1, wherein the outside of said body is substantially square in horizontal cross-section between said top and bottom surfaces.

3. A cigarette snuffer device as defined in claim 1, wherein said fastener means comprises a spring clip including a pair of rearwardly extending leaf spring members resiliently engageable over an extinguishing cup in said vehicle ash tray so as to grip said cup therebetween, for attachment of the body within the ash tray.

4. A cigarette snuffer device as defined in claim 3, wherein said leaf spring members have nested, cup-shaped gripping jaws thereon which are generally complementary with said extinguishing cup in the vehicle ash tray.

5. A cigarette snuffer device as defined in claim 1, wherein said body is generally hollow structure defined by a generally horizontal top wall, with generally vertical front, rear and side walls depending therefrom, and with a generally vertical snuffer tube depending from said top wall and defining said bore.

6. A cigarette snuffer device as defined in claim 5, wherein said fastener means comprises a spring fastening device which includes first spring clip means having a pair of spring legs engageable with said rear wall from its lower edge so as to resiliently engage the rear wall therebetween, and second spring clip means connected to said first spring clip means and exposed to the rear of the body for attachment to said vehicle ash tray.

7. A cigarette snuffer device as defined in claim 6, wherein said rear wall of the body has a generally vertically oriented notch therein, one of said legs of said first spring clip means being generally complementary with and located within said notch for positioning the connection of said spring fastening device with respect to the body.

8. A cigarette snuffer device as defined in claim 6, wherein said second spring clip means includes a pair of rearwardly extending leaf spring members resiliently engageable over an extinguishing cup in said vehicle ash tray so as to grip said cup therebetween.

9. A cigarette snuffer device as defined in claim 8, wherein said leaf spring members have nested, cup-shaped gripping jaws thereon which are generally complementary with said extinguishing cup in the vehicle ash tray.

References Cited

UNITED STATES PATENTS

| | | | |
|---|---|---|---|
| D. 101,312 | 9/1936 | Ridewood | 131—235 X |
| D. 177,954 | 6/1956 | Adams. | |
| 884,256 | 4/1908 | Addie. | |
| 1,480,069 | 1/1924 | Hipple | 131—235 |
| 2,597,275 | 5/1952 | Ahlstrand. | |
| 2,605,624 | 8/1952 | Halladay. | |
| 2,639,055 | 5/1953 | Carlson | 131—235 X |
| 3,386,452 | 6/1968 | Davis | 131—256 |

FOREIGN PATENTS

| | | |
|---|---|---|
| 179,869 | 5/1922 | Great Britain. |
| 717,758 | 11/1954 | Great Britain. |

JOSEPH S. REICH, Primary Examiner